United States Patent Office 3,037,933
Patented June 5, 1962

3,037,933
GREASES MADE BY THICKENING SILICONE OILS WITH SILICA AND SILICA COATED WITH OCTAMETHYLCYCLOTETRASILOXANE
John H. Wright, Waterford, N.Y., assignor to General Electric Company, a corporation of New York
No Drawing. Filed Oct. 31, 1960, Ser. No. 65,898
5 Claims. (Cl. 252—28)

This invention relates to silicone grease compositions. More particularly, this invention relates to silicone grease compositions of improved water leach resistance.

Silicone greases are well known in the art and are described, for example, in Patent 2,428,608, Bass. The greases of the aforementioned Bass patent consist of a silicone oil and a finely divided silica as a thickening agent. These silica thickened silicone greases have been used as lubricants, dielectric compounds, sealing compounds and high vacuum greases with various degrees of success.

The successful use of these greases has been limited by the fact that a satisfactory grease must, in many applications, be resistant to water and water vapor. In addition, these greases must have a satisfactory grease "structure" which remains after the grease has been subjected to mechanical work. While greases which consist of a silicone oil and a silica thickener have and retain a satisfactory structure, they exhibit very poor water leach resistance. When these greases are in contact with either water or water vapor, they are literally washed away from the surface with which they are in contact, leaving the surface completely unprotected.

A number of methods are discussed in the art of improving the water leach resistance of silica thickened silicone oil greases. While a number of these prior art methods accomplish this result, these methods result in greases which either fail to retain their water leach resistance at elevated temperatures or fail to retain their structure on working.

For example, Patent 2,870,108, Nickerson, suggests the treatment of finely divided silica with alkylorthosilicates, or hydrolysis products thereof, to produce a treated silica which is alleged to be useful in thickening silicone oils where water leach resistance is desired. While the use of this silicate-treated silica results in improved leach resistant greases, the greases still fail to retain their structure on working and lose their leach resistance upon being heated.

Another approach to the problem of improving the leach resistance of silica thickened silicone oil greases is shown in Patent 2,705,700, Iler, which suggests modifying the silica thickener by esterifying the surface thereof with an aliphatic monohydric alcohol. Again, greases containing this particular treated filler exhibit improved leach resistance but have unacceptably poor mechanical stability after working and lose their leach resistance when subjected to elevated temperatures.

Patent 2,818,385, Alexander and Iler, suggests the use of silica thickener which has been partially surface coated with organosiloxy groups. While the resulting grease is resistant to water, it is again found that the greases do not have the proper structure or stability and that the greases soften an unusual amount after being worked.

Because all of the prior art relating to the rendering of silica-filled silicone oil greases water leach resistant start by treating the silica filler with some type of material which will react with the hydroxyl groups which are present on the surface of untreated filler and will convert these hydroxy groups to organic groups to render the silica more or less hydrophobic, it has been suggested to employ silicas which have been rendered hydrophobic by treatment with various types of silicones. However, as pointed out in Patent 2,705,700, Iler, the treatment of silicas with silicone oil and the incorporation of this treated silica into a silicone grease does not produce a grease which is water leach resistant.

It has been found, however, that the treatment of finely divided silicas with a specific organopolysiloxane, octamethylcyclotetrasiloxane, by the method described in Patent 2,938,009, Lucas, results in a coated, finely divided silica which, when incorporated into a silicone oil, produces materials which are water leach resistant. However, these materials do not have a grease structure, but instead have a texture similar to gelatin. In addition, these materials are mechanically unstable in that they soften to an undesirable extent upon working.

Unexpectedly, I have found an improved water leach resistant silicone grease composition with satisfactory structure and mechanical stability and which remains leach resistant during use at elevated temperatures. This grease composition comprises a major portion of a silicone oil and a thickener for said oil comprising a mixture of two different types of finely divided silica. The first silica is a conventional untreated silica while the second silica is a finely divided silica having a coating on its surface of octamethylcyclotetrasiloxane. When this blend of fillers is employed as a thickening agent for silicone oils, the resulting silicone grease exhibits none of the undesirable properties of prior art materials.

The silicone oil employed in preparing the grease compositions of the present invention can be any one of the conventional silicone oils or organopolysiloxane fluids which are well known in the art. Many of these conventional silicone oils are described in Patents 2,469,890, Patnode, 2,469,888, Patnode, and 2,689,859, Burkhard. A particularly preferred group of organopolysiloxane fluids are those having the average formula:

(1) 

$$R_n SiO_{\frac{4-n}{2}}$$

where R represents a member selected from the class consisting of monovalent hydrocarbon radicals and halogenated monovalent hydrocarbon radicals and $n$ has a value of from 2.004 to 2.4.

Among the specific radicals represented by R in Formula 1 are alkyl radicals, e.g., methyl, ethyl, propyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated aliphatic radicals, e.g., chloromethyl, trifluoromethyl, chlorovinyl, etc. radicals; and haloaryl radicals, e.g., chlorophenyl, dichlorophenyl, tetrachlorophenyl, dibromophenyl, chloronaphthyl, etc. radicals.

Preferably, the radicals represented by R in Formula 1 are monovalent hydrocarbon radicals free of olefinic unsaturation with the preferred specific radical being methyl. Where the radicals represented by R in Formula 1 include radicals other than methyl, it is preferred that at least 50% of the radicals attached to silicon be methyl radicals. It should be understood that the organopolysiloxanes of Formula 1 include both linear triorganosilyl chain-stopped organopolysiloxanes as well as triorganosilyl chain-stopped branched chain organopolysiloxanes.

The organopolysiloxane fluids or silicone oils of Formula 1 can include siloxane units of various type and formulation, such as triorganosiloxane units and diorganosiloxane units alone or in combination with monoorganosiloxane units. The only requirement is that the ratio of the various siloxane units employed be such that the average composition of the copolymeric fluid is within the scope of Formula 1. It should also be understood that these various siloxane units contain the same or different silicon-bonded organic radicals. For example, the siloxane units employed in preparing the fluid of Formula 1 include trimethylsiloxane units, methylphenylsiloxane units, diphenylsiloxane units, triphenylsiloxane units, methylsiloxane units, phenylsiloxane units and tetrachlorophenylsiloxane units. It should also be understood that the silicone oils of Formula 1 can contain more than one organopolysiloxane fluid within the scope of Formula 1. Thus, two or more organopolysiloxane fluids within the scope of Formula 1 can be blended to form the silicone oil which forms the major component of my improved grease compositions.

Although any organopolysiloxane fluid within the scope of Formula 1 is applicable to the preparation of the improved grease compositions of the present invention, it is preferred that the organopolysiloxane fluid have a viscosity of from about 10 centistokes to about 100,000 centistokes when measured at 25° C.

The finely divided silica employed without modification as a thickening agent in the compositions of the present invention, and the finely divided silicas employed in the preparation of the octamethylcyclotetrasiloxane-treated silicas employed with the untreated silicas as thickening agents in the compositions of the present invention are also well known in the art. In general, these silicas are sufficiently fine so as to have a relatively high surface area per unit volume. In general, these finely divided silicas have a surface of at least one square meter per gram. Most preferable are those silicas having a surface area between about 4 to about 400 or more square meters per gram.

The preparation of high surface area silicas and the chemical changes that occur during the preparation of these silicas are described in "Natural and Synthetic High Polymers," by K. H. Meyer, page 85 (1942), and in Hurd "Chemical Reviews," vol. 22, No. 3, page 403 (1938). The silicas useful for my invention are those having numerous pores or voids therein. Included among the silicas useful in the practice of my invention are precipitated silicas, silica aerogels and fumed silicas.

A typical method of preparing precipitated silica comprises precipitating silica by the addition of sulfuric acid to a sodium silicate solution and working the resulting gel relatively free of salts with water. If the water is evaporated from the gel in this state, the latter shrinks considerably in volume due to the force exerted on the solid phase of the gel by the surface tension of the liquid as it recedes in the pores of the material. This results in a precipitated silica which is also called a xerogel. A typical precipitated silica is the material sold by the Columbia Southern Chemical Company under the name Hi-Sil X-303.

In contrast to precipitated silicas or xerogels, aerogels are composed of the original solid phase gel in substantially the same condition as while filled with the swelling liquid. Aerogels are conveniently made by raising the gel to the critical temperature of the liquid contained therein, while maintaining the pressure on the system sufficiently high to insure that the liquid phase will remain liquid until the critical temperature is reached. At this point the liquid will be converted into the gaseous state without the formation of menisci at the gas-liquid interface. The degree of porosity may be controlled to a large degree by controlling the concentration of silica in the gel as it is precipitated. These aerogels may be used in this condition or may be ground to a finer state of subdivision. Examples of commercial aerogels are Santocel C and Santocel CS which are marketed by the Monsanto Chemical Company and which have a specific surface area of from 100 to 200 square meters per gram.

In addition to the porous precipitated silica and silica aerogel described above, finely divided less porous silicas can also be used. These finely divided silicas are usually prepared by burning various siliceous compounds. For example, fumed silica is prepared by burning silicon tetrachloride. An example of fumed silica is the product sold by Godfrey L. Cabot Company as Cab-O-Sil or Aerosil. This silica has a surface of about 200 square meters per gram.

Another finely divided silica useful in the practice of the present invention can be prepared by burning silicate esters as described in Patent 2,399,687, McNabb. Still another finely divided silica is that described in "Chemical Engineering," 54, page 177 (1947), which silica has a specific surface area of about 240 square meters per gram.

While all of the finely divided silicas described above are chemically similar, it should be noted that these silicas differ among themselves in particle size and particle shape. In addition, these silicas vary as to the surface area as measured in meters per gram. All of these silicas, however, have surface areas in excess of one square meter per gram and are operable in the practice of the present invention. Chemically, each of these silicas contains a plurality of silicon-oxygen-silicon linkages which bind the atoms in the particles together and all of these silicas contain hydroxyl groups attached to their surfaces through silicon-oxygen linkages.

The octamethylcyclotetrasiloxane-treated fillers employed in the practice of the present invention are prepared from any of the finely divided silicas described above by merely coating the surfaces of the particles of the silica with octamethylcyclotetrasiloxane. One of the most useful methods for preparing these octamethylcyclotetrasiloxane-coated silicas is the method described and claimed in Patent 2,938,009, Lucas, which patent is incorporated by reference into the present application for the purpose of describing the method of preparing octamethylcyclotetrasiloxane-treated silica and for the description of such treated silica. Briefly, the method of this Lucas patent comprises mixing the finely divided silica and the octamethylcyclotetrasiloxane in proportions ranging from about 5 to 50% by weight of the octamethylcyclotetrasiloxane, based on the weight of the finely divided silica being treated. After effecting intimate dispersion of the silica in the octamethylcyclotetrasiloxane, the mixture is then heated at elevated temperatures, for example at temperatures of about 150° C. to 350° C., either at normal pressures or at reduced pressures, so that ready volatilization of the octamethylcyclotetrasiloxane takes place, diffusing this material through the silica particles and forming a coating of octamethylcyclotetrasiloxane on the surface of the silica. The use of the elevated temperatures and reduced pressures facilitates the rate of coating of the silica particles, which is usually accomplished in a time of from about 1 to 5 hours and these temperature and pressure conditions also facilitate removal of any excess octamethylcyclotetrasiloxane from the surfaces of the silica particles, leaving only a fine coating of the octamethylcyclotetrasiloxane on the particles.

The exact nature of the octamethylcyclotetrasiloxane coating on the silica particles is not known with certainty. For example, it is possible that a chemical reaction occurs between the octamethylcyclotetrasiloxane and the silica particles or alternatively, the octamethylcyclotetrasiloxane may merely be adsorbed on the surface of the silica. Regardless of the mechanism involved in the coating of the octamethylcyclotetrasiloxane on the silica particles, it is found that the octamethylcyclotetrasiloxane adheres to and coats the surface of the silica and changes the character of the silica insofar as the grease compositions of the present invention are concerned. Furthermore, it is known that when another organopolysiloxane such as one of the silicone oils which comprise the major component of the grease composition of my invention are used to treat the silica particles, the resulting treated silica is not operable in the practice of the present invention.

Another method of preparing octamethylcyclotetrasiloxane-coated finely divided silicas is the method described in the copending application of Hart K. Lichtenwalner, Serial No. 738,438, now Patent 3,004,859, filed May 28, 1958, and assigned to the same assignee as the present invention. This Lichtenwalner application is also incorporated by reference into the present application to describe an alternative method of preparing the treated silica particles. The method of this Lichtenwalner application comprises the spraying of octamethylcyclotetrasiloxane into sealed containers of finely divided silica and allowing the sealed containers to remain at room temperature until the octamethylcyclotetrasiloxane vapors have diffused throughout the silica filler mass and until the octamethylcyclotetrasiloxane has condensed or become absorbed on the surface of the silica particles, which treatment is effected in a time of from about 4 days to 6 weeks.

The improved grease compositions of the present invention are prepared by mixing the silicone oil, which forms the major proportion of the grease composition, with both finely divided silica which has been coated with the octamethylcyclotetrasiloxane and finely divided silica which has not been treated. For brevity, these two types of silica will be referred to sometimes hereinafter as "treated silica" and "untreated silica," respectively. The amounts of the untreated silica and treated silica which are added to the silicone oil can vary within fairly wide limits, depending upon the consistency desired in the final grease. The amounts of the treated silica and untreated silica added should be at least sufficient to thicken the silicone fluid but not so great as to form a composition which is pasty. In general, it has been found that the most satisfactory grease compositions are prepared with about 5 to 17 parts by weight of the mixture of treated silica and untreated silica per 100 parts by weight of the silicone oil. The ratios of treated silica to untreated silica in the grease composition can also vary within wide limits. For optimum results, however, it is preferred that the treated silica comprise from about 10% to about 90% by weight of the total weight of the treated silica and the untreated silica.

While any type of untreated silica and treated silica can be employed in preparing the grease compositions of the present invention, it is preferred that the untreated silica be fumed silica and that the treated filler also be formed from fumed silica. However, it should be understood that the two types of silica may also be different. Thus, the untreated silica can be precipitated silica while the treated silica can be prepared from a silica aerogel. After the silicone oil, the treated filler and the untreated filler are mixed together, the mixture is then blended by means well known in the art to form a grease. This blending is accomplished by subjecting the grease to a shearing action such as is produced by a conventional three-roll paint mill.

While the grease compositions of the present invention containing only the silicone oil, the treated silica and the untreated silica are perfectly satisfactory for most applications and have outstanding water leach resistance and satisfactory structure and mechanical stability and retain their leach resistance at elevated temperature, it is sometimes desired to add stabilizing agents to these compositions to further improve their mechanical stability. One of the most useful classes of stabilizers are the polyalkylene glycols and the monoalkyl ethers of such polyalkylene glycols. These polyalkylene glycol materials can be described generically as having the formula:

(2) 

where $R'$ is a member selected from the class consisting of hydrogen and lower alkyl radicals containing from 1 to 7 carbon atoms, $a$ and $b$ are integers equal to from 1 to 4, inclusive, $x$ is an integer equal to from about 4 to 50 more and preferably from 5 to 20, inclusive, and $y$ is a whole number equal to from 0 to about 50. These compounds can be prepared, for example, by forming polyalkylene glycols of ethylene glycol, propylene glycol or butylene glycol. These polyalkylene glycols are in turn reacted with a monohydric saturated aliphatic alcohol containing from 1 to 7 carbon atoms to form the monoether. A composition containing two different alkylene oxide groups can be prepared, for example, by reacting a polypropylene glycol with ethylene oxide in the presence of boronitrifluoride. This mixed polyalkylene glycol, if desired, can then be reacted with an alkanol such as butanol to form the monobutoxyether of the mixed polyalkylene glycol. A number of these polyalkylene oxide materials are commercially available including the materials sold under the tradename "Ucon" by Union Carbide Corporation, and the materials sold under the name of "Pluronic" by the Wyandotte Chemicals Corporation. When these stabilizers are added to the compositions of the present invention, they are present in an amount up to about 3 parts by weight per 100 parts by weight of the silicone oil.

An additional type of stabilizer useful in the compositions of the present invention are the boron compounds described in my copending application Serial No. 65,899, filed October 31, 1960, and assigned to the same assignee as the present invention. These boron compounds are members selected from the class consisting of boric acid, trimethoxyboroxine, and trialkylborates in which the alkyl radicals contain from 1 to 5 carbon atoms. These boron compounds are added in an amount sufficient to provide from 0.001 part by weight to 1.0 part by weight boron per 100 parts by weight of the silicone fluid. As described in my aforementioned copending application, in addition to the boron compounds, pentaerythritol can be added in combination with the boron compounds to further stabilize these compositions. When pentaerythritol is added in combination with the boron compound, the pentaerythritol is employed in an amount up to about 5 parts and preferably from 0.25 to 4.0 parts, by weight per part of the boron compound.

Where any of the mechanical stability additives described above are added to the compositions of the present invention, these additives are merely mixed with the silicone oil, the treated silica and the untreated silica prior to blending of the mixture into a grease.

The following examples are illustrative of the practice of my invention and are not intended for purposes of limitation. All parts are by weight. In all of the examples where a treated (with octamethylcyclotetrasiloxane) filler is employed, the treated filler was prepared by adding 100 parts of a finely divided silica to a kettle equipped with an agitator and heating means. The silica was agitated and 20 parts of octamethylcyclotetrasiloxane was added and thoroughly mixed with the silica. The silica-octamethylcyclotetrasiloxane mixture was then heated with agitation at a temperature of about 200° C. for 2 hours to insure thorough diffusion of the octamethylcyclotetrasiloxane through the silica and to insure that any excess octamethylcyclotetrasiloxane not required to coat the silica was evaporated from the reaction mixture. In the examples, the unworked penetrations and worked penetrations of the various greases were determined in accordance with the procedure of standard test ASTM D217–52T. The grease was worked by forcing a perforated disc back and forth through the grease for a total of 60 cycles. One method of determining the water resistance of the greases in the examples is referred to as the water seal test in which a one inch filter paper disc is dipped into a 25% aqueous cobalt chloride solution and dried in an oven. The dried paper is then placed in the bottom of a shallow container which is then filled with grease. The filled container is immersed in water at room temperature. The dry cobalt chloride paper is blue and the time required for the water to penetrate the grease and wet the paper is measured. When water wets the paper, the paper turns from blue to pink.

EXAMPLE 1

This example illustrates the preparation or attempted preparation of grease compositions containing untreated silicas, treated silicas and a mixture of untreated and treated silica thickening agents. Grease A was prepared by mixing 900 parts of a 350 centistoke trimethysilyl chain-stopped dimethylpolysiloxane fluid and 100 parts of a fumed silica having a surface of about 200 square meters per gram and milling the mixture. Composition B differed from grease A in that the untreated fumed silica was replaced with 100 parts of the same silica which had been treated with octamethylcyclotetrasiloxane as described above. Grease C differed from grease A in that the 100 parts of untreated silica was replaced with 50 parts of untreated silica and 50 parts of the treated silica used in composition B. All three of these compositions were applied to a ceramic surface and the grease coated surface was placed in a stream of water. At the end of one-half hour, grease A had washed completely off of the ceramic surface. At the end of 48 hours, composition B and grease C were still in substantially unchanged form on the surface of the ceramic material. Examination of other samples of the three compositions showed that grease A and grease C were satisfactory and uniform in appearance while composition B did not have a grease structure, but had a gelatin-like appearance. After aging grease A, composition B and grease C for 24 hours, the unworked penetration and the worked penetration of each composition was measured. Grease A had a worked penetration of 173. Grease C had a penetration of 260. In contrast to this, composition B was so soft after being worked that it was impossible to measure penetration. This example shows that it is necessary to employ both a treated filler and an untreated filler as a thickener to provide a grease composition which is both stable and water resistant.

EXAMPLE 2

This example illustrates the addition of a stabilizer to various grease formulations. The stabilizer employed is sold under the tradename "Ucon LB1145" and is a liquid monobutylether of a mixed polyethylene polypropylene glycol having a viscosity of about 248 centistrokes at 100° F. This material is more particularly described in the booklet "Ucon Fluids and Lubricants," published by Carbide and Carbon Chemicals Company (1956). Grease D was prepared by milling a mixture of 900 parts of the silicone oil described in Example 1, 100 parts of the untreated fumed silica described in Example 1 and 5 parts of the butylether stabilizer. In composition E, 100 parts of the treated filler of Example 1 was substituted for the untreated filler of grease D. In grease F, 50 parts of the treated filler were substituted for 50 out of the 100 parts of the untreated filler of grease D. Examination of these grease compositions showed that grease D and grease F were smooth and uniform appearing materials. In contrast to this, it was impossible to form a uniform grease from composition E. When composition E was milled in a manner similar to that of grease D and grease F, a rough, non-structured material was obtained. Further milling of this material did not change its appearance except that it became fluid and began to flow after extended milling. Composition E, therefore, was not satisfactory for any type of application. Greases D and F were worked 60 cycles per day for fourteen days and penetrations were measured. The worked penetration of grease D increased 39% from 178 at the end of the first day to 248 at the end of fourteen days. The penetration of grease F, within the scope of the present invention, increased only 20% from 235 to 283 over the same period of time. When grease D and grease F were placed on a ceramic surface and subjected to the water spray as in Example 1, grease D had washed away after about one-half hour while grease F still remained intact on the surface after 96 hours.

EXAMPLE 3

This example illustrates the use of silicone grease compositions in protecting a steel panel from rusting. Grease composition G was prepared by mixing and milling 85 parts of trimethylsilyl chain-stopped dimethylpolysiloxane fluid having a viscosity of 300 centistokes at 25° C., 11 parts of a finely divided fumed silica having a surface area of about 200 square meters per gram, 1 part of the stabilizing butoxy ether of Example 2 and 3 parts zinc naphthenate as a rust inhibitor. Grease H was identical to grease G except that 6 parts out of the 11 parts of the untreated fumed silica were replaced with 6 parts of the octamethylcyclotetrasiloxane-treated filler of the previous examples. These two greases were applied to the surface of a steel panel which was stored in a salt spray cabinet at 95° F. until the greases failed to protect the steel panel as indicated by the formation of rust on the panel more than ⅛ inch in from the top or sides of the panel. Grease G failed in less than 36 hours while grease H protected the panel for over 125 hours.

EXAMPLE 4

This example illustrates the use of a blend of two different silicone oils in the preparation of a grease composition. Grease J was prepared by mixing about 80 parts of a trimethylsilyl chain-stopped dimethylpolysiloxane fluid having a viscosity of 500 centistokes at 25° C., 20 parts of a trimethylsilyl chain-stopped copolymer of dimethylsiloxane units and monomethylsiloxane units having a viscosity of 50 centistokes at 25° C., 12 parts of the fumed silica described in Example 1 and 1 part of the polyethylene glycol monobutylether described in Example 2. Grease K is identical to grease J except that in grease K, three of the 12 parts of untreated fumed silica were replaced with 3 parts of the octamethylcyclotetrasiloxane-treated fumed silica described in Example 1. When grease J was applied to a ceramic surface and subjected to a water spray, the grease washed off in less than 1 hour. In contrast to this, grease K remained intact on the ceramic surface for over 48 hours.

EXAMPLE 5

This example illustrates the preparation of a grease formulation within the scope of the present invention in which the silicone oil contains some silicon-bonded phenyl groups. In particular, the silicone oil was a trimethylsilyl chain-stopped copolymer of 2.5 mol percent methylphenylsiloxane units and 97.5 mol percent dimethylsiloxane. This oil had a viscosity of about 450 centistokes at 25° C. Eighty-nine parts of this oil were mixed with 5 parts of the organopolysiloxane-treated fumed silica described in Example 1, 5 parts of the untreated fumed silica described in Example 1, and 1 part of the polyethylene glycol monobutylether described in Example 2. This mixture was blended to form a grease which had a worked penetration of 210. When applied to a ceramic surface, this grease composition had not washed off at the end of 48 hours under a water spray.

EXAMPLE 6

This example illustrates a water resistant grease prepared from a methylchlorophenyl silicone oil. More particularly, the silicone oil contained an average of 2.22 methyl groups per silicon atom and 0.03 chlorophenyl group per silicon atom with each phenyl group containing an average of about 4 chlorine atoms. This grease also differed from the greases described in the preceding examples in that it contained both trimethoxyboroxine and pentaerythritol in addition to the polyethylene glycol butylether as structure additives. The grease composition was prepared by mixing 86.6 parts of the methylchlorophenyl silicone oil, 6.0 parts of a finely divided silica aerogel having a surface area of about 400 square meters per gram, 1.5 parts of the fumed silica described in Example 1, 3.0 parts of the octamethylcyclotetrasiloxane-treated fumed silica described in Example 1, 1.0 part of pentaerythritol and 1.0 part of the polyethylene glycol monobutylether. After these ingredients were mixed, the mixture was milled to form a grease which was allowed to stand at room temperature for 24 hours. At the end of this time the penetration was measured and the unworked penetration was 220 while the worked penetration was 236. After heating for 24 hours at 200° C., this grease composition had a worked penetration of 260. When this sample was applied to the surface of a ceramic insulator and subjected to a fine water spray, the grease remained intact on the surface after 96 hours.

EXAMPLE 7

This example illustrates the variation of the ratio of untreated filler to treated fillers in grease compositions. A series of greases were prepared from 900 parts of the silicone oil of Example 1 and 100 parts of silica, which in some cases was an untreated silica, in other cases a treated silica and in still other cases a mixture of the two silicas. In each case the silica was the finely divided fumed silica of Example 1, which in some cases had been treated with octamethylcyclotetrasiloxane as in Example 1. In Table I below are listed the parts of silicone oil, untreated silica and treated silica in each composition, the number of hours resistance to water in the water seal test and the worked penetration of each grease after 24 hours of room temperature storage.

Table I

| Grease | L | M | N | O | P | Q |
|---|---|---|---|---|---|---|
| Oil | 90 | 90 | 90 | 90 | 90 | 90 |
| Untreated Silica | 10 | 8 | 6 | 4 | 2 | 0 |
| Treated Silica | 0 | 2 | 4 | 6 | 8 | 10 |
| Water Seal Resistance (hrs.) | 10 | 45 | 60 | 90 | 96 | 100 |
| Worked Penetration | 173 | 231 | 260 | 270 | 295 | ------ |

No value is reported for the worked penetration of grease Q since this grease turned into a fluid upon working and it was impossible to measure its penetration. As is shown from the data in the table, grease L, which was prepared from 100% untreated silica, exhibited very poor water seal resistance. In contrast to this, the remainder of the greases exhibited very satisfactory water seal resistance and all of the greases M, N, O and P, which contained a mixture of untreated filler and treated filler, were satisfactory in worked penetration.

EXAMPLE 8

This example illustrates the preparation of grease compositions employing silicas whose surfaces had been treated in accordance with certain prior art teachings. In each case, the silica employed was the finely divided silica filler of Example 1, which had been treated in accordance with the methods described below. Each grease composition consisted of 90 parts of the silicone oil of Example 1 and 10 parts of the treated filler. In grease R, the filler was the fumed silica of Example 1 which had been treated with butanol by the method of Patent 2,705,700, Iler. In grease S, the silica had been treated with dimethyldichlorosilane by the method of Patent 2,705,700, Iler. In grease T, the filler had been treated with a mixture of butanol and dimethyldichlorosilane by the method of Patent 2,818,385, Alexander et al. Grease U had a filler which had been treated with ethyl silicate in accordance with the teachings of Patent 2,870,108, Nickerson. In Table II below are listed the various greases described above and the results of the water seal resistance test.

Table II

| Grease | R | S | T | U |
|---|---|---|---|---|
| Filler Treatment | Butanol | Silane | Mixture | Silicate |
| Water Seal Resistance (hrs.) | 15 | 3 | 8 | 15 |

As shown by the above data, the maximum water seal resistance was 15 hours as compared with the minimum water seal resistance of 45 hours shown in Table I for greases within the scope of my invention.

EXAMPLE 9

This example illustrates the use of a mixture of untreated precipitated silica and treated silica aerogel in forming grease compositions of the present invention and also illustrates the use of a mixture of untreated silica aerogel and treated precipitated silica in preparing grease formulations within the scope of the present invention. Grease composition V was prepared from 85 parts of the silicone oil of Example 1, 8 parts of untreated precipitated silica having a surface area of about 150 square meters per gram and 7 parts of a treated silica aerogel which had been prepared by spraying 10 parts of octamethylcyclotetrasiloxane into a closed container of 80 parts of a silica aerogel having a surface area of about 200 square meters per gram and allowing the sealed container to remain sealed for 14 days. Grease W was prepared from 85 parts of the aforementioned silicone oil, 8 parts of the untreated silica aerogel described above and 7 parts of precipitated silica which had been coated with octamethylcyclotetrasiloxane in the manner described above. In the water seal resistance test, grease V resisted water for 92 hours while grease W resisted water for 96 hours.

While the foregoing examples have illustrated many of the variations in compositions possible within the scope of the present invention, it should be understood that this invention relates broadly to water leach resistant silicone greases comprising a major portion of a silicone oil and a sufficient amount of a mixture of fillers to thicken the oil to grease consistency, the mixture of fillers consisting of an untreated finely divided silica and an octamethylcyclotetrasiloxane-treated finely divided silica.

The grease compositions of the present invention are particularly useful in those applications in which leach resistance is required. For example, these grease compositions are useful for the coating of the insulators of internal combustion engine spark plugs where the effect of dirt and moisture from the air tends to provide paths of low resistance along the outside surface of the spark plug insulators, which cause short circuiting of the spark plugs. The water leach resistance of these greases, together with their mechanical stability, makes them ideally suited for this application.

What I claim as new and desire to secure by Letters Patent of the United States is:

1. A silicone grease composition of improved moisture resistance comprising a major proportion of a silicone oil and as thickening agents, a mixture of a finely divided silica and a finely divided silica having its surface coated with octamethylcyclotetrasiloxane, said mixture being composed of from about 10% to about 90% by weight, based on the weight of said mixture, of said finely divided silica having its surface coated with octamethylcyclotetrasiloxane.

2. A grease composition of improved moisture resistance which comprises a major proportion of a silicone oil and a mixture of thickening agents in an amount sufficient to thicken the silicone oil to a grease, said mixture of thickening agents containing a first finely divided silica and a second finely divided silica having its surface coated with octamethylcyclotetrasiloxane, said mixture being composed of from about 10% to about 90% by weight, based on the weight of said mixture, of said second finely divided silica.

3. The grease composition of claim 2 in which said first finely divided silica and said second finely divided silica are fumed silica.

4. A grease composition of improved resistance to moisture which comprises (a) a major proportion of a silicone oil, (b) a minor amount of a stabilizer comprising a monohydric alcohol ether of a polyalkylene glycol and (c) a thickening agent comprising a mixture of a first finely divided silica and a second finely divided silica having its surface coated with octamethylcyclotetrasiloxane, said mixture being composed of from about 10% to about 90% by weight, based on the weight of said mixture, of said second finely divided silica.

5. A silicone grease composition of improved moisture resistance which comprises (a) 100 parts by weight of a silicone oil, (b) from 5 to 17 parts of a mixture of a first finely divided silica and a second finely divided silica having its surface coated with octamethylcyclotetrasiloxane, said mixture being composed of from about 10% to about 90% by weight, based on the weight of said mixture, of said second finely divided silica and (c) up to about 3 parts by weight of a monohydric alcohol ether of a polyalkylene glycol.

References Cited in the file of this patent

UNITED STATES PATENTS

| | | |
|---|---|---|
| 2,567,316 | Bidaud | Sept. 11, 1951 |
| 2,583,604 | Sirianni et al. | Jan. 29, 1952 |
| 2,818,385 | Alexander et al. | Dec. 31, 1957 |
| 2,938,009 | Lucas | May 24, 1960 |